Nov. 29, 1960     D. D. MOORE     2,962,065
WHEEL SUPPORT WITH PNEUMATIC CLAMPING MEANS
Filed Oct. 3, 1955     2 Sheets-Sheet 1
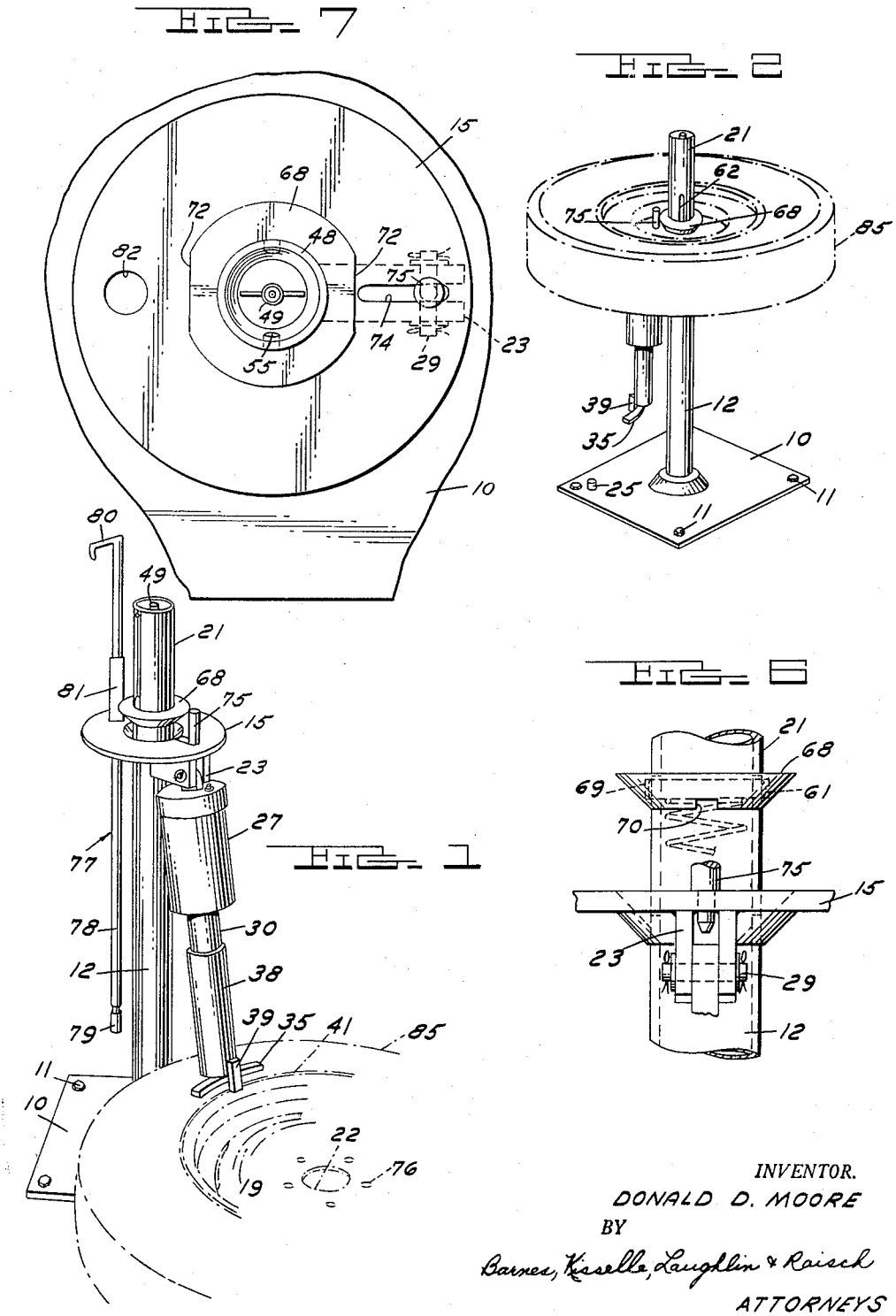
INVENTOR.
DONALD D. MOORE
BY
Barnes, Kisselle, Laughlin & Raisch
ATTORNEYS Nov. 29, 1960　　　D. D. MOORE　　　2,962,065
WHEEL SUPPORT WITH PNEUMATIC CLAMPING MEANS
Filed Oct. 3, 1955　　　　　　　　　　　2 Sheets-Sheet 2
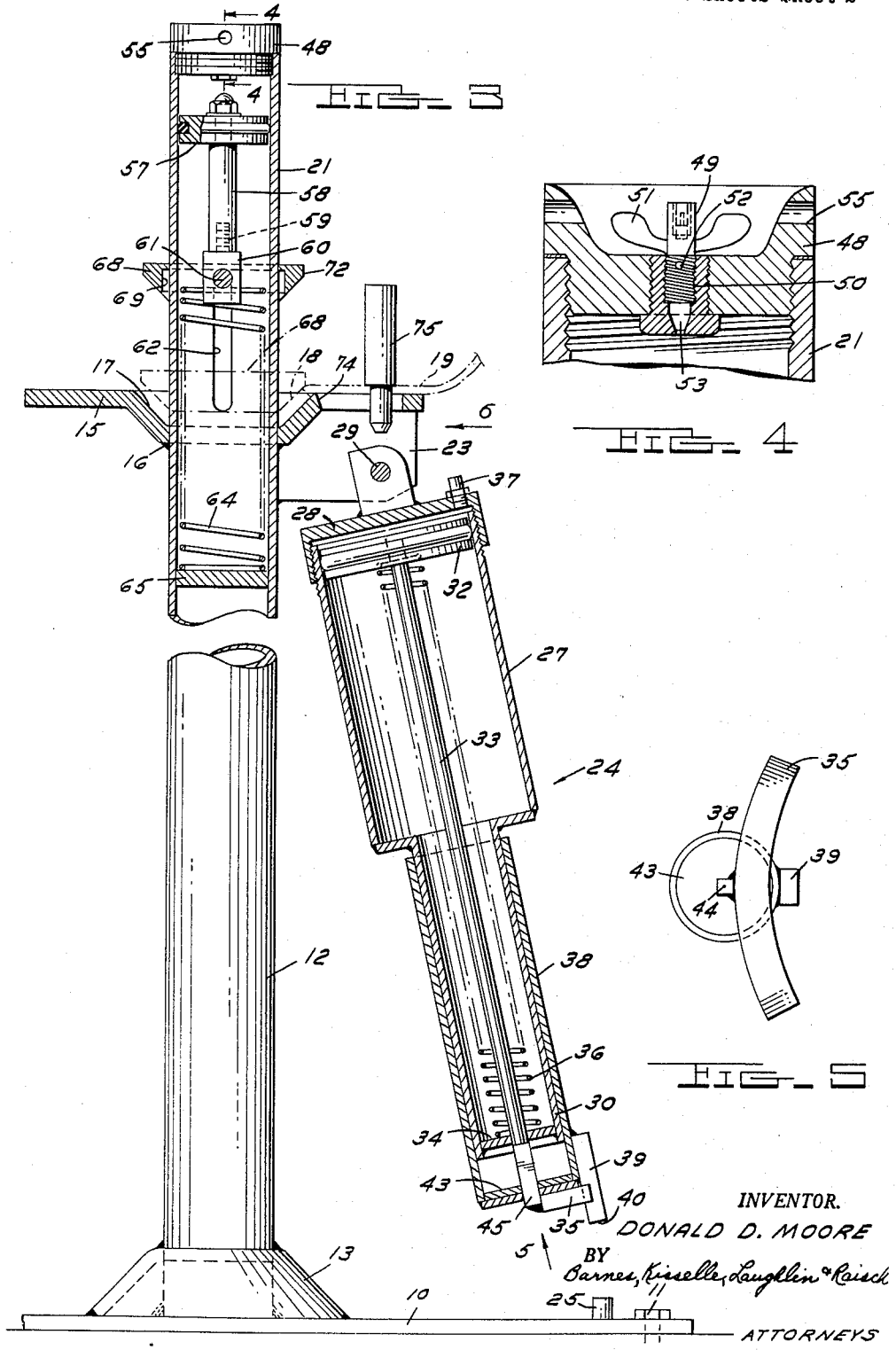
INVENTOR.
DONALD D. MOORE
BY
Barnes, Kisselle, Laughlin & Raisch
ATTORNEYS

United States Patent Office 2,962,065
Patented Nov. 29, 1960

2,962,065

WHEEL SUPPORT WITH PNEUMATIC CLAMPING MEANS

Donald D. Moore, Wyandotte, Mich., assignor to May Brothers Manufacturing Company, Inc., Wyandotte, Mich., a corporation of Michigan Filed Oct. 3, 1955, Ser. No. 538,211

3 Claims. (Cl. 144—288)

This invention relates to a pneumatic tool for use in removal and replacement of a tire on a vehicle wheel.

The invention may be used in connection with either inner tube tires or tubeless tires and is especially adapted for use in service stations and the like where compressed air is usually available.

An object of this invention is to provide a simple, inexpensive device for quickly and easily breaking a tire bead away from a wheel rim without danger of injury to the tire bead and for holding a wheel in a convenient position to facilitate rapid removal and replacement of a tire tube or tire on the wheel. Another object of the invention is to provide such a device which can be operated pneumatically by compressed air equipment ordinarily found in automotive maintenance shops, service stations and the like.

The invention generally contemplates the use of a tire bead breaker pivotally anchored on a support and having a free end with a lug arranged to seat on a wheel rim for properly positioning a pneumatically actuated bead breaker element against a tire wall adjacent the wheel rim. The support also has pneumatically actuated clamp means for holding a wheel in a generally horizontal position while a tire thereon is removed and replaced. One form of the invention is shown in the accompanying drawings which may be briefly described as follows:

Fig. 1 is a perspective view of the device of this invention being used for breaking the tire bead away from a wheel rim.

Fig. 2 is a perspective view of the device in use as a wheel support.

Fig. 3 is a partly sectional view, illustrating structure of the bead breaking and support mechanism.

Fig. 4 is an enlarged sectional view on line 4—4 of Fig. 3.

Fig. 5 is an elevational view taken in the direction of arrow 5 in Fig. 3.

Fig. 6 is a generally elevational view taken in the direction of arrow 6 in Fig. 3 with parts shown in phantom to illustrate structure.

Fig. 7 is a top elevational view of the wheel support structure.

The device shown in the drawings has a base plate 10 which may be supported on a supporting surface by screws 11. A hollow post 12 is secured in a generally vertical position on base plate 10 by such means as a welded skirt 13. A plate 15 is fixed in a generally horizontally extending position on post 12 such as by welding 16 and the plate has a depressed central portion 17 adapted to receive a central hub portion 18 of a vehicle wheel 19 (Fig. 3). The upper end portion 21 of post 12 is arranged to project through the hub opening 22 in wheel 19 and contains pneumatically operable means for clamping the wheel against plate 15. Plate 15 has a depending bracket 23 forming a support for a pneumatically operated bead breaker mechanism shown generally at 24. Base plate 10 preferably has a lug 25 for positioning a wheel and tire thereon relatively to the bead breaker.

Bead breaker 24 has a cylinder 27 with one end 28, which may comprise a threaded cap, pivotally anchored on bracket 23 as at 29, the other end 30 of the cylinder preferably having the form of an ensmalled extension and being free to swing a preferably generally vertical plane. A pneumatically operable piston 32 in the cylinder has a piston rod 33 projecting slidably through a lower end plate 34 on the cylinder and fixed on a bead breaker element 35, which preferably has generally arcuate form. A compressed coil spring 36 seats on plate 34 and reacts against piston 32. A fitting 37 is provided at upper end 28 of the cylinder for introducing air under pressure above piston 32. Fitting 37 is preferably adapted for engagement with a standard compressed air hose fitting of the type ordinarily found in automotive maintenance shops, filling stations and the like.

A sleeve 38 is rotatably and axially slidably mounted around lower end 30 of the cylinder and has a lug 39 fixed thereon. Lug 39 has a lower end 40 adapted to seat on the peripheral rim portion 41 of a vehicle wheel 19. Piston rod 33 is axially slidably but non-rotatably connected to sleeve 38. For this purpose, the sleeve preferably has a lower end plate 43 with a rectangular opening 44 therein, the lower end portion 45 of the piston rod having rectangular form and slidably extending through opening 44.

The upper end portion 21 of hollow post 12 is closed by a threaded cap or plug 48 having a valve 49 therein for introducing air under pressure into the post. Valve 49 is preferably of the type ordinarily used on automobile tires so that pressure can be maintained within the post. The valve body is threaded into place as at 50 and has wings 51 to facilitate manually backing the valve body out of cap 48 sufficiently to expose ports 52 which communicate with the inner valve passageway 53 for relieving pressure in the post. Plug 48 has openings 55 for receiving a wrench.

A pneumatically operable piston 57 in upper portion 21 of post 12 has a connecting rod 58 threadedly connected as at 59 to a block 60 having a pin 61 thereon which projects radially outwardly of post 12 through axially extending slots 62 therein. A compressed spring 64 seats on pin 61 and reacts against a member 65 secured across the interior of the post.

A collet 68 is slidably mounted around the exterior of upper portion 21 of the post. The collet may be removed over the top end of the post. The collet has an internally reentrant axial flange as shown at 69 with axial slots 70 opening to the reentrant portion and being arranged to pass the outwardly projecting ends of pin 61. The collet is detachably secured to pin 61 by passing slots 70 axially over the pin and rotating the collet so that the pin ends project into reentrant portion 69. Collet 68 may be provided with flattened sides 72 to provide a visual indication of the position of slots 70 (Fig. 7).

Horizontal plate 15 has a slot 74 extending outwardly of post 12. A shouldered drop pin 75 is arranged to project through an opening 76 in a wheel body, such as a bolt hole or a positioning hole, and to project through slot 74. Slots 70 in the collet are preferably aligned with flats 72 so that the collet is locked to pin 61 when the flats are aligned with slot 74 as illustrated in Fig. 7.

A tire iron 77 may be conveniently provided with the device. The tire iron is shown as having a shank 78 with a roller 79 at one end, a hook 80 at the other end and an intermediate enlarged portion 81. Plate 15 has a hole 82 through which shank 78 may be inserted for storage purposes, enlargement 81 seating on plate 15 to support the tire iron.

In use, it may be assumed that base plate 10 is installed on a supporting surface through bolts 11 with post 12 in a generally upright position. In a bead breaking operation, a wheel 19 with a tire 85 thereon is positioned adjacent post 12 for contact by lug 39 and breaker element 35. Tire 85 may be of inner tube type or the tubeless type. This may conveniently be done by placing the tire against post 12 and moving it outwardly until an edge 41 of the wheel rim contacts stop 25 on base 10. The free lower end of the bead breaker is swung about pivot 29 and sleeve 38 is manually adjusted axially and rotationally on cylinder extension 30 so that the lower end 40 of lug 39 seats on an edge 41 of the wheel rim (Fig. 1).

Sleeve 38 and lug 39 shift axially relatively to piston rod 33 and breaker element 35, but the lug and breaker element rotate together when the sleeve is turned because of interengagement of square opening 44 in the sleeve end plate and the square end portion 45 of the piston rod. Lug 39 has substantial width so that when its lower edges are positioned against the rim edge it supports arcuate breaker element 35 in a position generally circumferentially parallel to the rim edge and to the tire bead. When lug 39 is seated on the rim, the breaker element is positioned to engage a side wall of the tire immediately adjacent the tire bead.

Bead breaker 35 is forced downwardly generally axially of wheel 19 for breaking the tire bead away from rim 41 by introducing air under pressure into cylinder 27 above piston 32 through fitting 37 by means of a standard type compressed air fitting. Breaker element 35 is positively positioned adjacent the tire bead and it moves in a direct linear path against the tire so that it will not pinch or otherwise harm the tire or tire bead. The breaker element is prevented by lug 39 from shifting radially outwardly of the tire during its movement to insure breaking the bead away from the rim. The stroke of piston 32 is limited to prevent the breaker element from pinching the tire against base plate 10. Preferably the breaker element moves only to about the axial center of rim 41. Piston 32 and the bead breaking element are returned to their retracted positions under the action of spring 36 by removing the air fitting from fitting 37 so that the compressed air in the cylinder escapes.

In some cases it may be necessary to repeat this bead breaking operation at one or more circumferential locations around the wheel, in which case the wheel and tire are merely rotated on base 10, lug 39 repositioned on the rim and compressed air introduced into the cylinder as described. Where desired, the wheel and tire may be turned over and the tire bead on the other axial side of the tire may be broken away from the rim in the manner described.

To clamp a wheel 19 in a horizontal position on plate 15, collet 68 is removed over the top of post 12, pin 75 is removed from slot 74 and tire iron 77 is removed from plate 15 by withdrawing shaft 78 through hole 82. The central hub opening 22 of the wheel is lowered over the upper end portion 21 of post 12 so that the body of the wheel rests on plate 15. A bolt hole 76 or similar opening in the wheel body is aligned with slot 74 in the plate and drop pin 75 is inserted through the hole and slot to secure the wheel against rotation on the plate.

Collet 68 is lowered over upper end 21 of the post and is turned so that slots 70 pass over the outwardly projecting ends of pin 61. The collet is then turned so that the pin ends enter reentrant portion 69 of the collet to lock the collet and pin together. Visible indicia of the locked collet position is provided by alignment of flats 72 on the collet with slot 74 in plate 15. Compressed air is then introduced into the upper portion 21 of post 12 through valve 49 by means of a standard compressed air hose fitting. Piston 57, connecting rod 58, pin 61 and collet 68 are forced downwardly so that the collet clamps central portion 18 of wheel 19 against plate 15. The outwardly projecting ends of pin 61 move in axial slot 62 during movement of the collet. Tire 85 may be removed or replaced by the use of tire iron 77 in the usual manner or other work may be performed on the wheel and tire which is solidly supported on post 12.

To remove wheel 19 from its support, valve 49 is backed out of plug 48 by manually turning wings 51 until ports 52 are exposed to relieve the air pressure within the upper portion 21 of post 12. Spring 64 forces collet 68 upwardly until pin 61 engages the top of slot 62. The collet is rotated approximately 90° to align slots 70 with the ends of pin 61 and is then lifted upwardly over the top of the post. Pin 75 is withdrawn from slot 74 and hole 76. The wheel may then be disengaged from the support by lifting it upwardly over the top of the post. To clamp another wheel on the support, valve 49 is screwed down to seal ports 52 and the wheel, pin 75 and collect 68 are assembled in clamped relation on the support as described. When not in use, collet 68 may be conveniently returned to its position around post 12, pin 75 to its position in slot 74 and tire iron 77 to its position on plate 15 to minimize the danger of their loss.

I claim:

1. A pneumatic tire tool comprising, a support including a generally vertical hollow post, said post having an upper end portion adapted to extend through a hub opening in a wheel, a bracket fixedly mounted on said post below said upper end portion and being adapted to support a wheel in generally horizontal position, a piston pneumatically movable in a vertical direction within said upper end portion of said post, valve means selectively operable for introducing air under pressure into said upper end portion of said post and relieving the pressure therein, said post having a longitudinal slot extending above said bracket, pin means operably connected to said piston and projecting radially through said slot to the exterior of said post, a collet slidably mounted around said post, means detachably securing said collet to said pin means, said collet being arranged to engage the hub region of a wheel for clamping the wheel against said bracket responsively to air introduced through said valve and acting on said piston, said collet being removable from said post when air pressure in said post is relieved for removing a wheel from said support.

2. A pneumatic tire tool comprising, a support including a generally vertical hollow post, said post being adapted to extend through a hub opening in a wheel, a bracket on said post adapted to support a wheel in generally horizontal position, a piston pneumatically movable in a vertical direction within said post, valve means in said post selectively operable for introducing air under pressure into said post and relieving the pressure therein, said post having axial slot means therein, pin means operably connected to said piston, said pin means projecting radially outwardly of said post through said slot means, a collet slidably mounted around said post, said collet having an axial flange, said flange having internal reentrant form with axial opening means thereto, said pin means engaging within the reentrant portion of said collet and being arranged to pass through said opening means, whereby to selectively engage and disengage said collet and pin means by manipulating the relative rotational and axial positions thereof, said collet being arranged to engage the hub region of a wheel for clamping the wheel against said bracket responsively to air introduced through said valve and acting on said piston, said collet being removable from said post when air pressure in said post is relieved for removing a wheel from said support.

3. A pneumatic tire tool comprising, a support including a generally vertical hollow post, said post having an upper end portion adapted to extend through a hub opening in a wheel, a bracket fixedly mounted on said post below said upper end portion and being adapted to support a wheel in generally horizontal position, said bracket having therein a slot extending outwardly of said post, a drop pin adapted to project into an opening in a wheel body, said pin being arranged to extend into said slot to secure a wheel against rotation relatively to said bracket while supported thereon, a piston pneumatically movable in a vertical direction within said upper end portion of said post, valve means in said post selectively operable for introducing air under pressure into said upper end portion of said post and relieving the pressure therein, said post having a longitudinal slot extending above said bracket, pin means operably connected to said piston and projecting radially through said longitudinal slot to the exterior of said post, a collet slidably mounted around said post, means detachably securing said collet to said pin means, said collet being arranged to engage the hub region of a wheel for clamping the wheel against said bracket responsively to air introduced through said valve and acting on said piston, said collet being removable from said post when air pressure in said post is relieved for removing a wheel from said support.

References Cited in the file of this patent

UNITED STATES PATENTS

| | | |
|---|---|---|
| 1,809,169 | Kennedy | June 9, 1931 |
| 2,449,960 | Toles | Sept. 21, 1948 |
| 2,505,172 | Coats | Apr. 25, 1950 |
| 2,530,572 | Eckles | Nov. 21, 1950 |
| 2,535,562 | Boger et al. | Dec. 26, 1950 |
| 2,616,487 | Parks | Nov. 4, 1952 |
| 2,708,954 | Schltz | May 24, 1955 |
| 2,753,923 | Bowyer | July 10, 1956 |